March 30, 1954   A. STRAHM   2,673,374
METHOD OF FABRICATING ARTICLES OF PLASTIC MATERIAL
IN AT LEAST TWO MOLDING OPERATIONS
Filed May 12, 1951
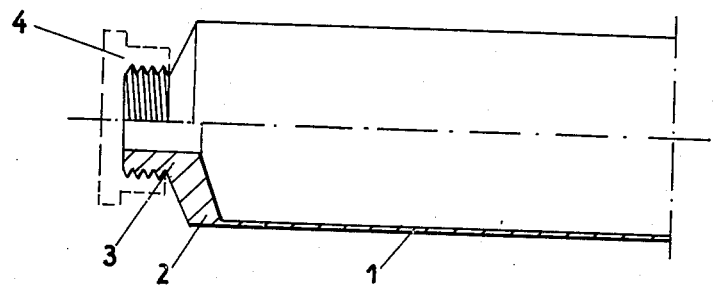
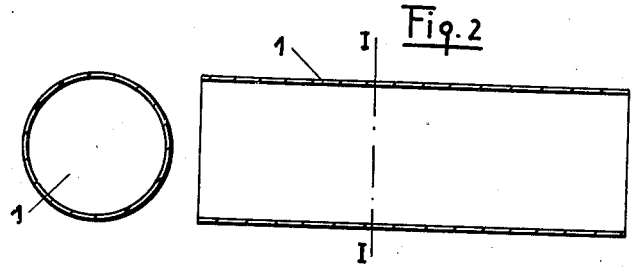
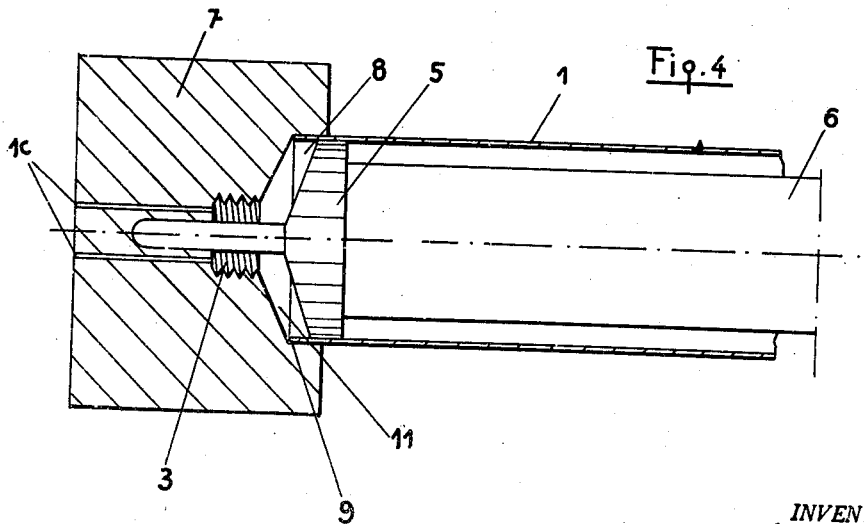
INVENTOR.
ANDRÉ STRAHM
BY
*Leon M. Strauss*
AGT.

Patented Mar. 30, 1954

2,673,374

UNITED STATES PATENT OFFICE 2,673,374

METHOD OF FABRICATING ARTICLES OF PLASTIC MATERIAL IN AT LEAST TWO MOLDING OPERATIONS

André Strahm, Villeneuve, Switzerland, assignor to Unitubo, S. A., Vevey, Switzerland, a corporation of Switzerland Application May 12, 1951, Serial No. 225,932

Claims priority, application Switzerland May 15, 1950

4 Claims. (Cl. 18—59)

This invention relates to the manufacture of articles, in particular of tubular articles from plastic material.

It is one of the objects of the invention to provide a method facilitating the fabrication of collapsible tubular articles by very economical and rapid operational steps, whereby said articles are each provided with two elements, namely, a relatively thick-walled head piece and with a relatively thin-walled tubular body substantially without visible trace of joint between said elements, since the outer diameter of the head piece and of the tubular body remains constant at their location of juncture.

It is another object of the invention to provide a method affording a new process for the manufacture of tubular articles from plastic material which are composed of at least two elements having different wall thicknesses and colors, but one and the same diameter at the location of juncture of said elements.

It is a further object of the invention to provide a method conducive to the production of a light-weight tubular article from plastic material, which may be packed, shipped and stored in a very economical manner and withstands considerable stresses.

The invention further contemplates the injection molding of plastic material in a first mold to thereby obtain a first constituent element of the article to be produced, and then to bring into engagement said first element with a second mold to achieve injection molding for a second constituent element which is united with the first constituent element to form the article in finished form.

The invention aims further at the production of tubular articles composed of at least two constituent elements intimately joined or united with each other and under most favorable operational conditions.

According to the invention it is now possible to manufacture very long thin-walled articles having at their ends a protuberance, such as a head with screw threads, the new process permitting also rapid stripping of delicate and complicated molded pieces from the mold.

These and other objects and advantages will ensue from the description of the invention, the attached claims and from the drawing, in which:

Fig. 1 is a part sectional view of a preferred article to be produced according to the invention, Fig. 2 is a longitudinal vertical section of the first constituent element forming part of the article of Fig. 1, Fig. 3 is a transverse sectional view taken along lines I—I of Fig. 2, Fig. 4 is a further sectional view of the mold used in conjunction with the second constituent element as seen in Fig. 1.

The article illustrated in Fig. 1 is a tubular container with a screw-threaded closure neck, comprising a very thin-walled cylindrical or tubular part 1 ending in a frusto-conical shoulder 2 of relatively large thickness, so that the part 1 is able to retain its shape; this shoulder portion 2 has a screw-threaded cylindrical part 3 adapted to mate with threads on a cap 4 indicated in phantom lines.

This tube is manufactured as follows:

The first constituent element or part 1 of the article is obtained by the injection molding of a plastic in a suitable mold. Element 1 is then mounted on the head 5 of a plunger 6 and thereafter engaged in mold 7, which has a cylindrical cavity 8 for the lodgment of an end of said element 1 and of a diameter closely conforming to that of said element 1. Head 5 of the plunger may be used to insert element 1 into the mold cavity and to center it in relation to the axis of said cavity 8 for which purpose a location pin is provided on the respective end face of head 5.

This pin then enters a corresponding recess in mold or die 7. Plunger head end 5 also serves to close element 1 at a predetermined distance from the respective end of tubular element 1 to thereby regulate the thickness of shoulder 2.

Thus a space 11 is defined between the end of plunger head 5 and the die 7, which space is adjustable and may be used in the formation of the parts 2 and 3. The die 7 is furnished with channels 10 for the injection of the material to be molded.

The stripping of the molded article from the mold can readily be carried out, having regard to the fact that the die is composed of a number of parts.

Polyethylene may conveniently be used as the plastic material in the formation of the article.

It can thus be seen that there has been disclosed a novel method of fabricating from plastic material a tubular article with a head piece, said method being characterized by the steps of injection-molding a relatively thin-walled tubular element, introducing into said tubular element from one end thereof forming means for supporting said tubular element, locating the end face of said forming means a predetermined distance from the other end of said tubular element, positioning said other end of said tubular element in abutment with a wall which defines a recess in an injection mold, whereby said end face of said forming means is so located with respect to said wall of said mold recess as to thereby close the latter and to define the wall thickness of said head piece, injecting molding material into the space bounded by said other end of said tubular element and by said end face of said forming means to thereby obtain said head piece and to join the same within the confines only of said other end of said tubular element to the latter, whereby the outer diameter of said element remains unchanged at the juncture with said head piece.

I claim:

1. The method of fabricating from plastic material a tubular article with a head piece; comprising the steps of injection-molding a relatively thin-walled tubular element, introducing into said tubular element from one end thereof forming means for supporting said tubular element, locating the end face of said forming means a predetermined distance from the other end of said tubular element, positioning said other end of said tubular element in abutment with a wall of said tubular element in abutment with a wall which defines a recess in an injection mold, whereby said end face of said forming means is so located with respect to said wall of said mold recess as to thereby close the latter and to define the wall thickness of said head piece, injection molding material into the space bounded by said other end of said tubular element and by said end face of said forming means to thereby form said head piece and join the same within the confines only of said other end of said tubular element to the latter, whereby the outer diameter of said element remains unchanged at the juncture with said head piece.

2. The method of fabricating from plastic material a tubular article with a head piece comprising introducing into a tubular element from an end thereof forming means for supporting said tubular element, locating an end face of said forming means a predetermined distance from an end of said tubular element, positioning said end of said tubular element in abutment with a wall which defines a recess in an injection mold, whereby said end face of said forming means is so located with respect to said wall of said mold recess as to thereby close the latter and to define the wall thickness of said head piece, injecting molding material into the space bounded by said mold wall, said end of said tubular element and by said end face of said forming means to thereby form said head piece and join the same within the confines only of said end of said tubular element to the latter, whereby the outer diameter of said element remains unchanged at the juncture with said head piece.

3. The method of fabricating from plastic material a tubular article with a head piece comprising introducing into a tubular element from an end thereof forming means for supporting said tubular element, locating an end face of said forming means a predetermined axial distance from an end of said tubular element to expose a portion of the inner surface of the tubular element, positioning said end of said tubular element in abutment with a wall which defines a recess in an injection mold, whereby said end face of said forming means is so located with respect to said wall of said mold recess as to thereby close the latter and to define the wall thickness of said head piece, injecting molding material into the space bounded by said mold wall, the said exposed inner surface of the tubular element and said end face of said forming means to thereby form said head piece and join the same within the confines of said end of said tubular element to the latter.

4. The method of fabricating from plastic material a tubular article with a head piece comprising introducing into a tubular element from an end thereof forming means for supporting said tubular element, locating an end face of said forming means a predetermined distance from an end of said tubular element, positioning said end of said tubular element in abutment with a wall which defines a recess in an injection mold, whereby said end face of said forming means is so located with respect to said wall of said mold recess as to thereby close the latter and to define the wall thickness of said head piece, injecting molding material into the space bounded by said mold wall, said end of said tubular element and by said end face of said forming means to thereby form said head piece and join the same within the confines of said end of said tubular element to the latter.

ANDRÉ STRAHM.

References Cited in the file of this patent

UNITED STATES PATENTS

| Number | Name | Date |
|---|---|---|
| 2,347,737 | Fuller | May 2, 1944 |

FOREIGN PATENTS

| Number | Country | Date |
|---|---|---|
| 54,793 | Netherlands | June 15, 1943 |
| 511,601 | Great Britain | Aug. 22, 1939 |